UNITED STATES PATENT OFFICE.

NOAH L. BISHOP, OF AMENIA, NEW YORK.

IMPROVEMENT IN PROCESSES OF TREATING CONDENSED MILK TO PREVENT CRYSTALLIZATION OF THE SUGAR.

Specification forming part of Letters Patent No. 156,973, dated November 17, 1874; application filed October 31, 1874.

*To all whom it may concern:*

Be it known that I, N. L. BISHOP, of Amenia, in the county of Dutchess, in the State of New York, have invented a new and Improved Mode of Arresting or Preventing the Crystallization of the Sugar of Milk in Milk that has been Condensed by the usual and well-known methods; and I do declare that the following is a full and exact description thereof.

The usual method of preserving milk is to condense it by evaporation in a vacuum-pan or other suitable apparatus, to form a sirup or paste. The vacuum-pan is generally preferred.

To keep the milk from undergoing change after condensation, a preliminary heating has been employed, as described by Gail Borden and others. This coagulates the albumen, and preserves the milk; but after the albumen has been coagulated, the process of evaporation becomes more difficult. Now, my invention consists in first evaporating the milk, and, after it has attained the proper consistency, injecting into it steam from 220° Fahrenheit to 425°. This both tends to thicken or solidify the milk by coagulating the albumen, and also prevents the crystallization of the milk-sugar.

The means thus used for injecting the steam are by an iron pipe, or other pipe, passing through and into the vessel in which the milk may be condensed, and the end immersed into the condensed milk; but any other suitable apparatus may be substituted for this device, which is no part of my invention.

Having thus described my invention, what I claim, and desire to secure by Letters Patent, is—

The process herein described for treating condensed milk, the same consisting in injecting into the condensed milk steam, substantially as described, so as to prevent the crystallization of the sugar of milk, as set forth.

N. L. BISHOP.

Witnesses:
MILES R. LEWIS,
T. W. PARSONS.